(12) United States Patent
Chi et al.

(10) Patent No.: US 7,612,852 B2
(45) Date of Patent: Nov. 3, 2009

(54) MULTI-DOMAIN VERTICAL ALIGNMENT LIQUID CRYSTAL DISPLAY HAVING TWO SUB-PIXEL REGIONS

(75) Inventors: Chun-Yung Chi, Miao-Li (TW);
Yu-Cheng Lin, Miao-Li (TW);
Chueh-Ju Chen, Miao-Li (TW);
Chiu-Lien Yang, Miao-Li (TW);
Jia-Pang Pang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 0 days.

(21) Appl. No.: 12/006,008

(22) Filed: Dec. 29, 2007

(65) Prior Publication Data
US 2008/0158495 A1  Jul. 3, 2008

(30) Foreign Application Priority Data
Dec. 29, 2006 (TW) .............................. 95149709 A

(51) Int. Cl.
*G02F 1/1337* (2006.01)
(52) U.S. Cl. .................. 349/129; 349/128; 349/130
(58) Field of Classification Search .................. 349/129
See application file for complete search history.

(56) References Cited
U.S. PATENT DOCUMENTS
7,110,075 B2  9/2006  Tak et al.
2004/0075798 A1*  4/2004  Inoue et al. ................. 349/129
2005/0200782 A1*  9/2005  Chen et al. ................... 349/129
2006/0146241 A1*  7/2006  Choi et al. .................... 349/129
2006/0203166 A1*  9/2006  Inoue et al. .................. 349/129
2007/0126965 A1*  6/2007  Huang et al. ................ 349/129
2007/0153186 A1*  7/2007  Shih et al. .................... 349/129
2008/0088783 A1*  4/2008  Tai et al. ....................... 349/129

* cited by examiner

*Primary Examiner*—Frank G Font
*Assistant Examiner*—Eric Wong
(74) *Attorney, Agent, or Firm*—Wei Te Chung

(57) ABSTRACT

An exemplary multi-domain vertical alignment LCD (200) includes a common electrode, a pixel electrode and a liquid crystal layer sandwiched between the common electrode and the pixel electrode. The LCD is regularly divided into a plurality of frist and second sub-pixel regions (250, 260). The first sub-pixel region corresponding to two of the first protrusions (241), one of the second protrusions (242), one of the first slits (281), and two of the second slits (282), a second sub-pixel region corresponding to two of the third protrusions (243), one of the fourth protrusions (244), one of the third slits (283), and two of the fourth slits (284), a first ratio of first distance between the first slit and the second slit to a first width of the first slit is less than second ratio of second distance between the third slit and the fourth slit to second width of the third slit.

20 Claims, 6 Drawing Sheets

MULTI-DOMAIN VERTICAL ALIGNMENT LIQUID CRYSTAL DISPLAY HAVING TWO SUB-PIXEL REGIONS

FIELD OF THE INVENTION

The present invention relates to vertical alignment liquid crystal displays (LCDs), and particularly to a eight-domain vertical alignment liquid crystal display having two different sub-pixel regions in each pixel region thereof.

GENERAL BACKGROUND

Since liquid crystal displays are thin and light, consume relatively little electrical power, and do not cause flickering like in cathode ray tube (CRT) displays, they have helped spawn product markets such as laptop personal computers. In recent years, there has also been great demand for liquid crystal displays to be used as computer monitors and even televisions, both of which are larger than the liquid crystal displays of laptop personal computers. Such large-sized liquid crystal displays in particular require that an even brightness and contrast ratio prevail over the entire display surface, regardless of observation angle.

Because the conventional twisted nematic (TN) mode liquid crystal display cannot easily satisfy these demands, a variety of improved liquid crystal displays have recently been developed. They include in-plane switching (IPS) mode liquid crystal displays, optical compensation TN mode liquid crystal displays, and multi-domain vertical alignment (MVA) mode liquid crystal displays. In multi-domain vertical alignment mode liquid crystal displays, each pixel is divided into multiple regions. Liquid crystal molecules of the pixel are vertically aligned when no voltage is applied, and are inclined in different directions when a voltage is applied.

Referring to FIG. 4, a typical multi-domain vertical alignment liquid crystal display (LCD) 100 includes a first substrate 110, a second substrate 120 parallel to the first substrate 110, and a liquid crystal layer 130 sandwiched therebetween. The liquid crystal layer 130 includes a number of liquid crystal molecules 130 having negative dielectric anisotropy.

The first substrate 110 assembly includes an upper polarizer 112, a first transparent substrate 111, a color filter 113, a common electrode 115, and a first alignment film 114 arranged in that order from top to bottom. The first substrate 110 further includes a number of first protrusions 141. Referring also to FIG. 5, the first protrusions 141 are arranged at an inner surface of the first alignment film 114 along generally V-shaped paths. The color filter 113 includes a number a red filters (not shown), a number of blue filters (not shown), and a number of green filters (not shown) sequentially arranged in that order.

The second substrate 120 assembly includes a lower polarizer 122, a second transparent substrate 121, a number of pixel electrodes 127, and a second alignment film 124 arranged in that order from bottom to top. The second substrate 120 further includes a number of second protrusions 142. The second protrusions 142 are arranged at an inner surface of the second alignment film 124 along generally V-shaped paths. The first protrusions 141 and the second protrusions 142 are arranged alternately.

Referring to FIG. 5, when the LCD 6 is in an off state, the liquid crystal molecules 131 are oriented perpendicular to the first substrate 110. In operation during the off state, incident light beams become linearly-polarized light beams after passing through the lower polarizer 122. Because the light beams transmit along the long axes of the liquid crystal molecules 131, after the linearly-polarized light beams pass through the liquid crystal layer 130, the polarizing directions of the linearly-polarized light beams remain unchanged. Thus the linearly-polarized light beams cannot pass though the upper polarizer 112, which has a polarizing axis perpendicular to that of the lower polarizer 122. As a result, the LCD 100 displays a black image.

Referring to FIG. 6, when the LCD 100 is in an on state, voltages are applied thereto, and voltage differences between the common electrode 115 and pixel electrodes 127 generate electric fields perpendicular to the first and second substrates 110, 120. Because the liquid crystal molecules 131 have negative dielectric anisotropy, they are inclined to become oriented parallel to the first substrate 110. Further, the protrusions 141, 142 affect the orientations of the liquid crystal molecules 131, such that the liquid crystal molecules 131 form inclined alignments perpendicular to the slopes of the protrusions 141, 142. Referring also to FIG. 7, the liquid crystal molecules 131 orient in four directions A, B, C and D.

In operation during the on state, incident light beams become linearly-polarized light beams after passing through the lower polarizer 122. Because of birefringence of the liquid crystal molecules 131 and the electric fields, the polarizing directions of the linearly-polarized light beams change to align with the polarizing axis of the upper polarizer 112 after passing through the liquid crystal layer 130. Accordingly, part of the light beams pass through the upper polarizer 112. Therefore, the LCD 100 displays an image with desired brightness.

Because the liquid crystal molecules 131 are oriented in four directions A, B, C and D, color shift that would otherwise be manifest in images displayed by the LCD 100 is compensated. In particular, the LCD 100 has a more even display performance along four different viewing directions corresponding to the directions A, B, C and D. That is, the LCD 100 attains a display having four domains.

However, the four-domain configuration can only compensate visual performance in four directions.

What is needed, therefore, is a multi-domain vertical alignment LCD having more domains that can provide a uniform display in more viewing directions.

SUMMARY

In one preferred embodiment, a multi-domain vertical alignment LCD includes a first substrate including a first transparent substrate, a common electrode formed at an inner surface of the transparent substrate, and a plurality of first, second, third, and fourth protrusions arranged at an inner surface of the common electrode; a second substrate including a second transparent substrate; a pixel electrode formed at an inner surface of the second transparent substrate; a plurality of first, second, third, and fourth slits defined in the pixel electrodes; and a liquid crystal layer sandwiched between the two substrates. A plurality of pixel regions is regularly defined by the two substrates and the liquid crystal layer sandwiched therebetween. The pixel regions are arranged in a regular array, and each pixel region includes a first sub-pixel region and a second sub-pixel region. The first sub-pixel region corresponds to two of the first protrusions, one of the second protrusions, one of the first slits, and two of the second slits, and is divided into four domains by the first and second protrusions and the first and second slits. The second sub-pixel region corresponds to two of the third protrusions, one of the fourth protrusions, one of the third slits, and two of the fourth slits, and is divided into four domains by the third and fourth protrusions and the third and fourth slits. A first ratio of a first distance between the first slit and each of the second slits to a first width of the first slit is less than a second ratio of a second distance between the third slit and each of the fourth slits to a second width of the third slit.

Other novel features, advantages and aspects will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments in detail.

Figure 1:
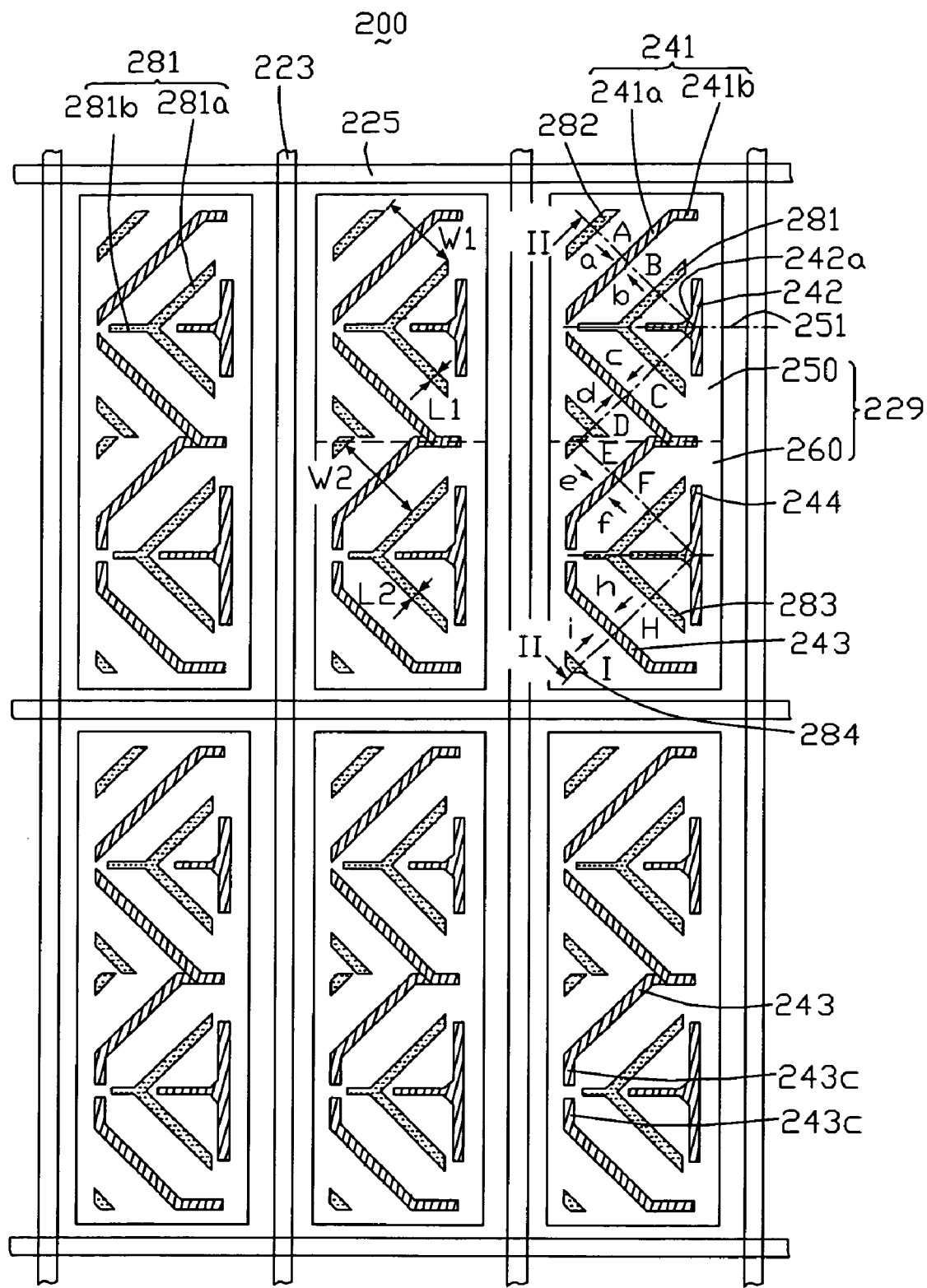
FIG. 1 is a top plan view of a portion of a multi-domain vertical alignment LCD according to a first embodiment of the present invention, the multi-domain vertical alignment LCD including a number of pixel regions each including two sub-pixel regions.
Figure 2:
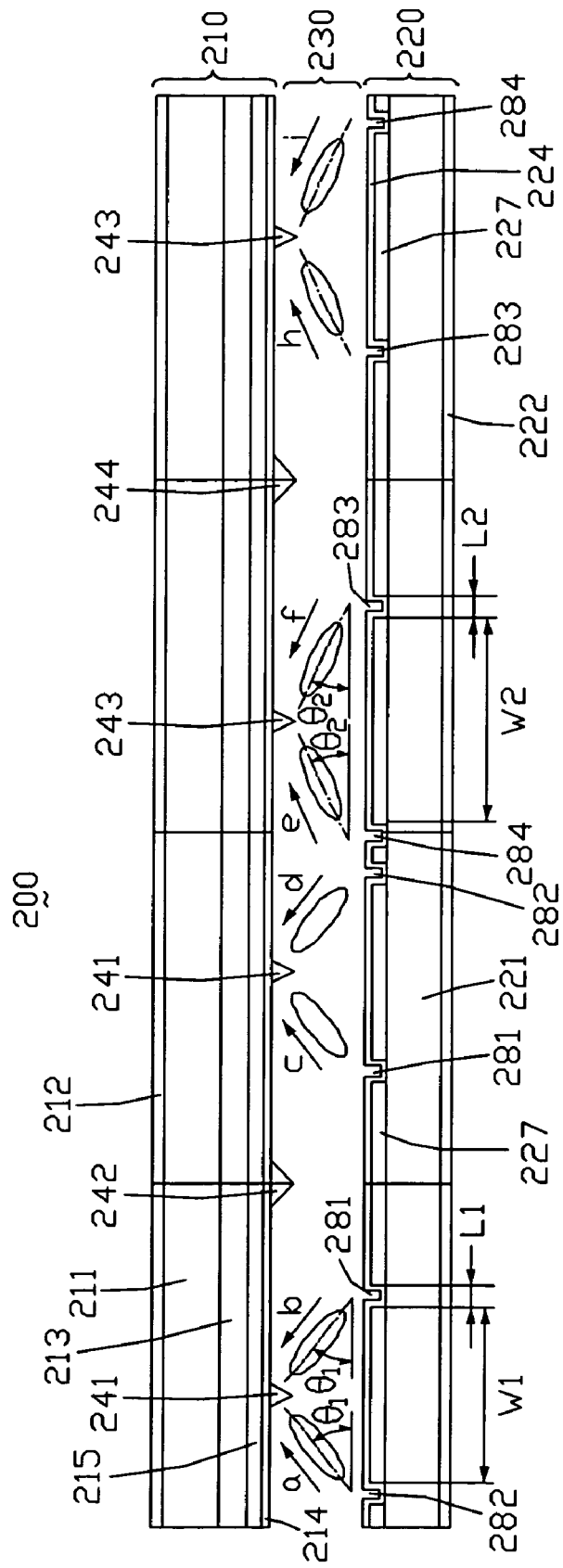
FIG. 2 is an enlarged, side cross-sectional view taken along line II-II of FIG. 1.

Referring to FIG. 1 and FIG. 2, part of a multi-domain vertical alignment LCD 200 according to a first embodiment of the present invention is shown. The multi-domain vertical alignment LCD 200 includes a first substrate 210, a second substrate 220 parallel to the first substrate 210, and a liquid crystal layer 230 sandwiched therebetween. The liquid crystal layer 230 includes a number of liquid crystal molecules (not labeled) having negative dielectric anisotropy.

The first substrate 210 includes an upper polarizer 212, a first transparent substrate 211, a color filter 213, a common electrode 215, and a first alignment film 214 arranged in that order from top to bottom. The first substrate 210 further includes a number of first protrusions 241, a number of second protrusions 242, a number of third protrusions 243, and a number of fourth protrusions 244. The first, second, third, and fourth protrusions 241, 242, 243, 244 are arranged at an inner surface of the common electrode 215. The color filter 213 includes a number of red filters, a number of green filters, and a number of blue filters sequentially arranged in that order.

The second substrate 220 includes a second transparent substrate 221 and a lower polarizer 222 formed at an outside surface of the second transparent substrate 221. The second substrate 220 further includes a number of data lines 223, a number of gate lines 225, and a number of pixel electrodes 227 formed at an inner surface of the second transparent substrate 221, and a second alignment film 224 formed at an inner surface of the pixel electrode 227. The data lines 223 are parallel to each other, with each of the data lines 223 extending along a first direction. The gate lines 225 are parallel to each other, with each of the gate lines 225 extending along a second direction that is orthogonal to the first direction. A smallest area formed by any two adjacent gate lines 225 together with any two adjacent data lines 223 defines a pixel region 229 thereat.

In each pixel region 229, the second substrate 220 further includes a number of first slits 281, a number of second slits 282, a number of third slits 283, a number of fourth slits 284 defined in the pixel electrodes 227.

Each pixel region 229 corresponds to a red filter, a green filter or a blue filter of the color filter 213, and includes a first sub-pixel region 250 and a second sub-pixel region 260.

Each first sub-pixel region 250 corresponds to two of the first protrusions 241, one of the second protrusions 242, one of the first slits 281, and two of the second slits 282. The first protrusions 241 and the second protrusions 242 have triangular transverse sectional shapes.

Each first protrusion 241 includes a first main strip 241a and a first extending strip 241b connecting to the first main strip 241a. In each first sub-pixel region 250, the two first main strips 241a of the first protrusions 241 are arranged along a substantially V-shaped path. Each first main strip 241a is arranged along a respective one of the two arms of the V-shaped path. The two first extending strips 241b extend from two ends of the two first main strips 241a respectively, and are parallel to the gate lines 225. As illustrated, the two first extending strips 241b extend to two right-side corners of the first sub-pixel region 250, as viewed in FIG. 1. The two first protrusions 241 in each first sub-pixel region 250 are symmetrical about an axis 251. In the illustrated embodiment, an angle formed between the two first main strips 241a is approximately 90°.

The second protrusion 242 is arranged along a substantially T-shaped path, which is located in a space between the two first protrusions 241. The second protrusion 242 includes two inclined sides 242a, at two inner elbow portions of the T-shaped path. The inclined sides 242a are parallel to the first main strips 241a, respectively. The second protrusion 242 is symmetrical about the axis 251.

The first slit 281 is arranged along a Y-shaped path, and is located between the main strips 241a and the second protrusion 242 as viewed in FIG. 1. The first slit 281 includes a V-shaped slit 281a adjacent the second protrusion 242, and a strip slit 281b connecting to a point portion of the V-shaped slit 281a. The strip slit 281b is arranged along the axis 251, and is adjacent to where the first main strips 241a oppose each other. The V-shaped first slit 281a are parallel to the V-shape formed by the first main strips 241a.

The second slits 282 in the first sub-pixel region 250 are each arranged along a strip path, and are parallel to the first main strips 241a, respectively. The second slits 282 are located at two left corners of the first sub-pixel region 250, as viewed in FIG. 1. The first main strips 241 a are located between the first slit 281 and the second slits 282, respectively, in each first sub-pixel region 250.

A horizontal distance W1 between the V-shaped slit 281a of the first slit 281 and either one of the adjacent second slits 282 is defined as a first width of the pixel electrode 227 in each first sub-pixel region 250. The distance W1 is calculated such that portions of the second alignment film 224 at the first slit 281 and either one of the adjacent second slits 282 are not included in the span of the distance W1. A width of the first slit 281 and either one of the second slits 282 is defined as L1. The width L1 is calculated such that portions of the second alignment film 224 at the first slit 281 and either one of the second slits 282 are included in the span of the width L1.

The second sub-pixel region 260 is similar to the first sub-pixel region 250. The second sub-pixel region 202 corresponds to two of the third protrusions 243, one of the fourth protrusions 244, one of the third slits 283, and two of the fourth slits 284. The third protrusions 243, the fourth protrusion 244, the third slit 283, and the fourth slits 284 of the second sub-pixel region 260 are similar to the first protrusions 241, the second protrusion 242, the first slit 281, and the second slits 282 of the first sub-pixel region 250, respectively. However, each third protrusion 243 further includes a second extending strip 243c. The two second extending strips 243c extend from two ends of two third main strips (not labeled) of the two third protrusions 243. The two second extending strips 243c extend toward each other, and are adjacent and parallel to the corresponding data line 223. The two second extending strips 243c are symmetrical about an axis (not labeled) of the second sub-pixel region 260, such axis being similar to the axis 251 of the first sub-pixel region 250.

In the illustrated embodiment, one of the first extending strips 241b of the first sub-pixel region 250 adjacent to the second sub-pixel region 260 is a "shared" first extending strip 241b, because it also constitutes one of the first extending strips (not labeled) of the second sub-pixel region 260 adjacent to the first sub-pixel region 250.

A horizontal distance W2 between the third slit 283 and either one of the adjacent fourth slits 284 is defined as a second width of the pixel electrode 227 in each second sub-pixel region 260. The distance W2 is calculated such that portions of the second alignment film 224 at third slit 283 and either one of the adjacent the fourth slit 284 are not included in the span of the distance W2. A width of the third slit 283 and either one of the fourth slits 284 is defined as L2. The width L2 is calculated such that portions of the second alignment film 224 at the third slit 283 and either one of the fourth slits 284 are included in the span of the width L2. The second width W2 is greater than the first width W1, and the width L2 is approximately equal to the width L1.

According to the above-described configuration, the first sub-pixel region 250 is divided into four domains A, B, C, D, by the first and second protrusions 241, 242 and the first and second slits 281, 282. The second sub-pixel region 260 is divided into four domains E, F, G, H, by the third and fourth protrusions 243, 244 and the third and fourth slits 283, 284.

When the multi-domain vertical alignment LCD 200 is in an on state, voltages are applied thereto. In the first sub-pixel region 250, a voltage difference between the common electrode 215 and pixel electrodes 227 generates a fringe electric field. The fringe electric field is inclined near the first slit 281 and the second slit 282. Because the liquid crystal molecules have negative dielectric anisotropy, they are inclined to orient perpendicular to the direction of the fringe electric field. Considering the effects of the first protrusions 241 and the second protrusions 242 together, the liquid crystal molecules are oriented at an angle $\theta 1$ with respect to the second substrate 220, and are oriented in four directions a, b, c, d in the four domains A, B, C, D, respectively.

Liquid crystal molecules in the second sub-pixel region 260 are oriented in four directions e, f, g, h in similar fashion to the liquid crystal molecules of the first sub-pixel region 250. However, because the width W1 between the first and second slits 281 is less than the width W2 between the third and fourth slits 283, 284, strengths of fringe fields in the first sub-pixel region 250 are less those of the second sub-pixel region 260. Thus, the liquid crystal molecules are oriented at an angle $\theta 2$ with respect to the second substrate 220. The angle $\theta 2$ of the liquid crystal molecules in the second pixel region 260 is less than the angle $\theta 1$ of the liquid crystal molecules in the first pixel region 250.

In a word, strengths of fringe fields in the two sub-pixel regions 250, 260 are different from each other when any one voltage is applied to the multi-domain vertical alignment LCD 200. Thus angles between the liquid crystal molecules and the second substrate 220 in the two sub-pixel regions 250, 260 are different from each other under any one applied voltage. Therefore, the multi-domain vertical alignment LCD 200 is an eight-domain vertical alignment LCD.

Unlike conventional multi-domain LCDs, the multi-domain vertical alignment LCD 200 attains a visual effect that is an overall result of eight domains, and therefore provides a very even display performance. Thus, a display quality of the multi-domain vertical alignment LCD 200 is improved.

Furthermore, portions of the first, second, third, and fourth protrusions 241, 242, 243, 244 parallel to the gate line 225 and data line 223 can prevent liquid crystal molecules located at borders between two adjacent domains from having no on-state orientation.

Figure 3:
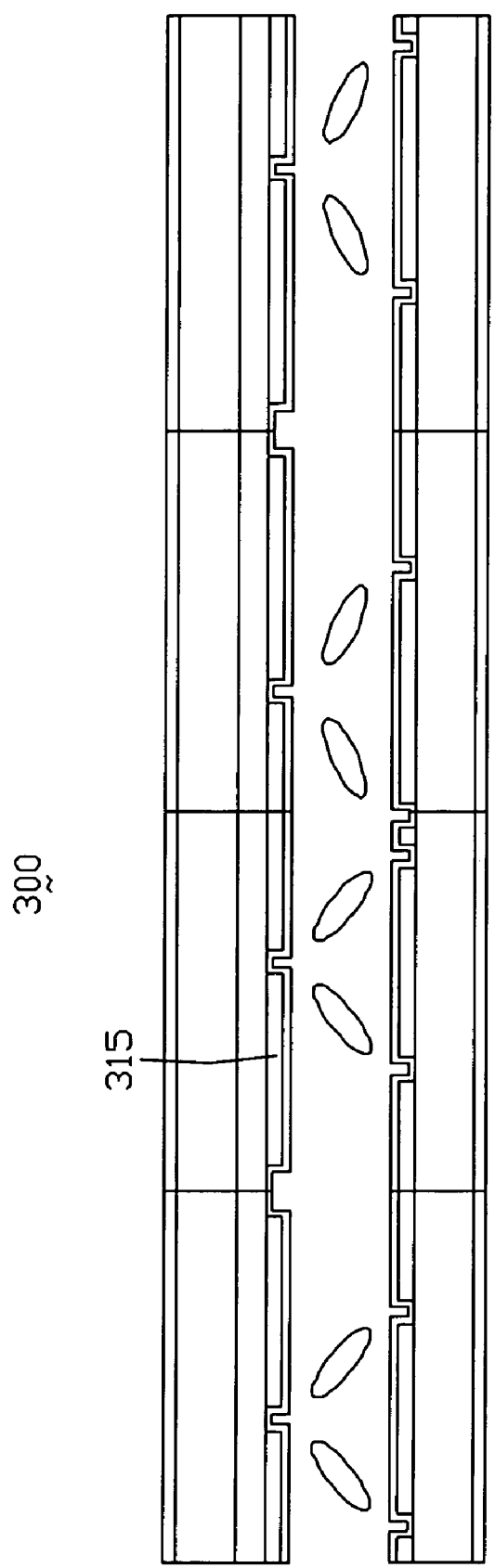
FIG. 3 is similar to FIG. 2, but showing a corresponding view in the case of part of a multi-domain vertical alignment LCD according to a second embodiment of the present invention.
Figure 4:
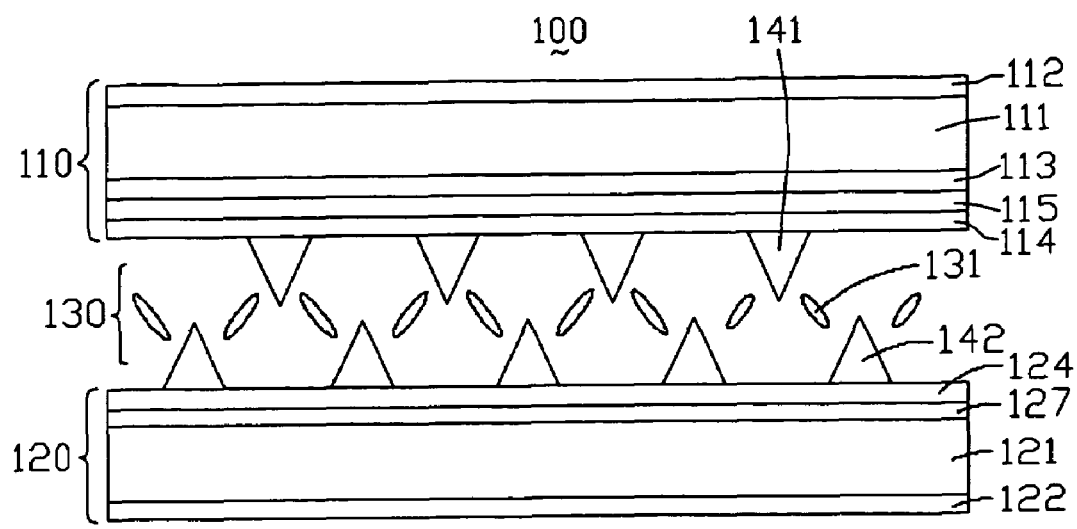
FIG. 4 is a side cross-sectional view of part of a conventional multi-domain vertical alignment LCD, the multi-domain vertical alignment LCD including a multiplicity of liquid crystal molecules.
Figure 5:
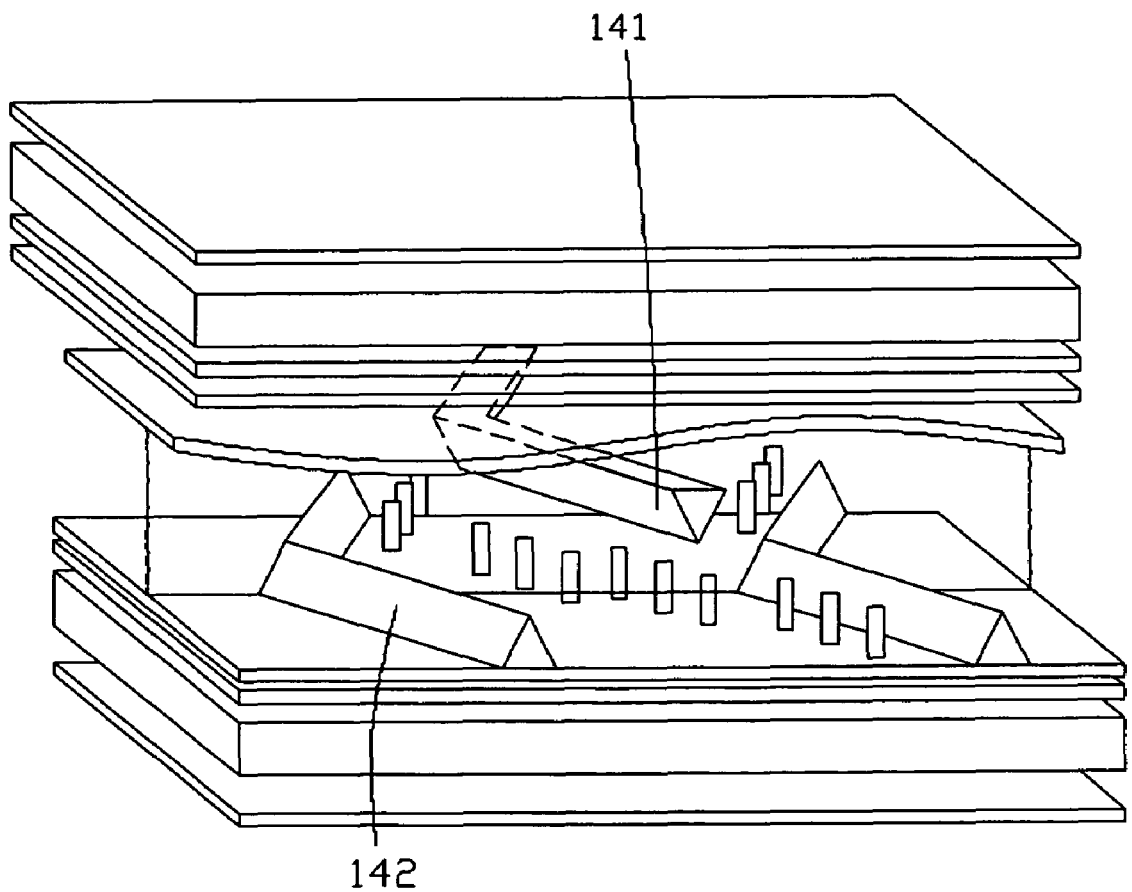
FIG. 5 is an exploded, isometric view of a portion of the multi-domain vertical alignment LCD of FIG. 4, showing alignments of the liquid crystal molecules when the multi-domain vertical alignment LCD is in an off state.
Figure 6:
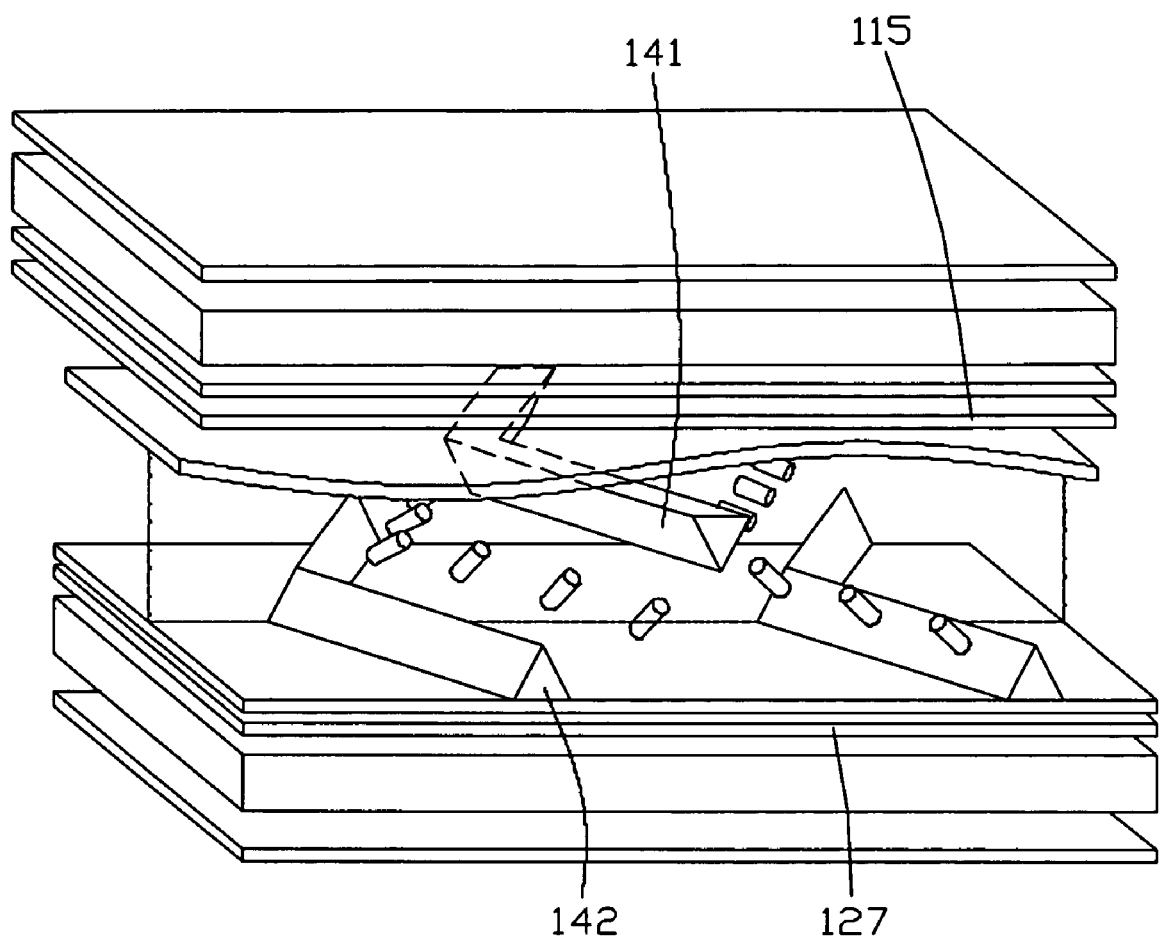
FIG. 6 is similar to FIG. 5, but showing alignments of the liquid crystal molecules when the multi-domain vertical alignment LCD is in an on state.
Figure 7:
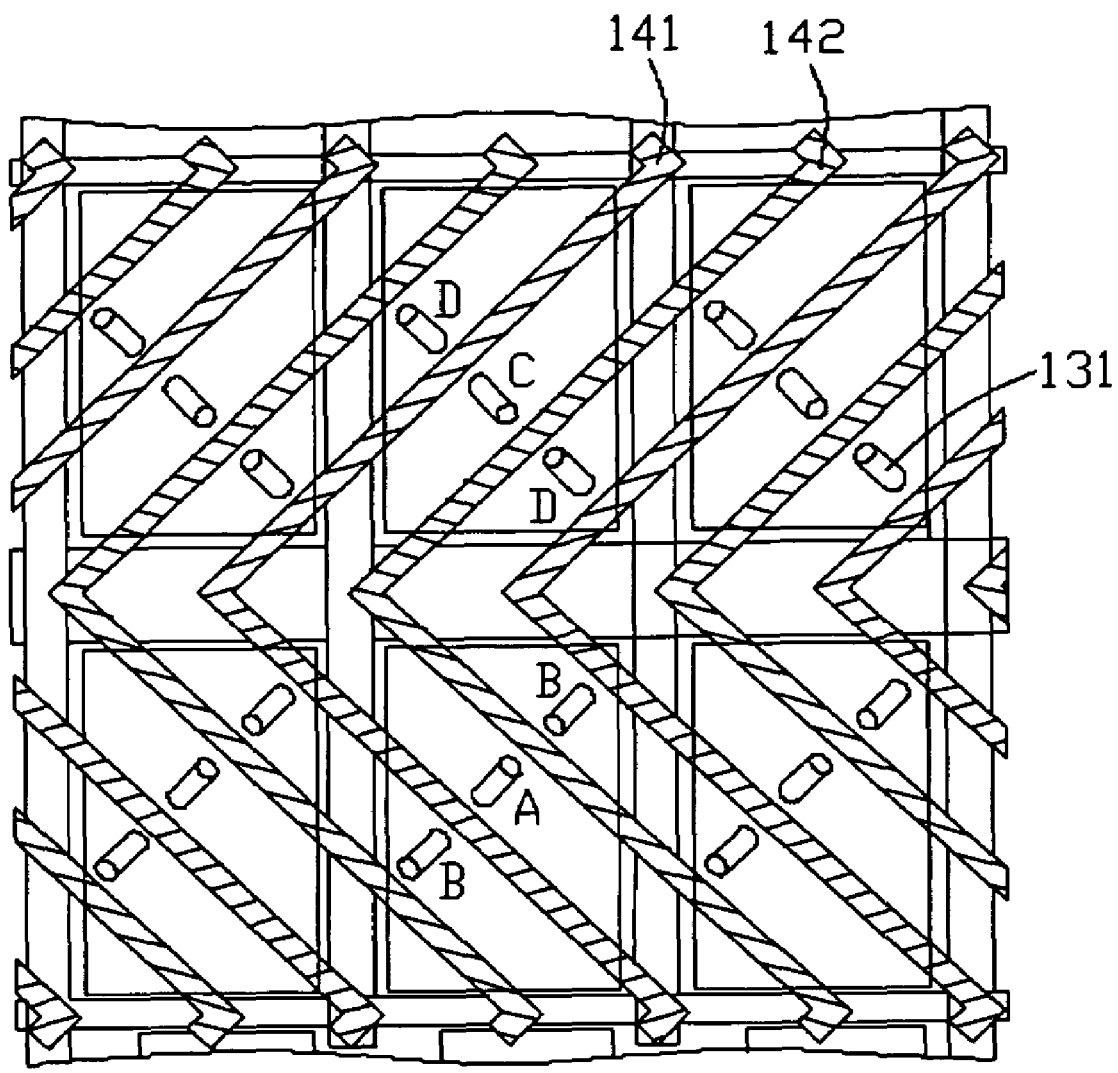
FIG. 7 is a top plan view of a portion of the multi-domain vertical alignment LCD of FIG. 4, showing the alignments of the liquid crystal molecules when the multi-domain vertical alignment LCD is in the on state.
Figure 7:
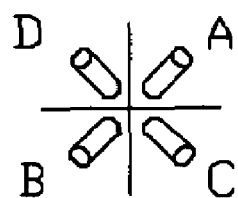

Referring to FIG. 3, a multi-domain vertical alignment LCD 300 according to a second embodiment of the present invention is shown. The multi-domain vertical alignment LCD 300 is similar to the multi-domain vertical alignment LCD 200. However, a common electrode 315 thereof defines a number of fifth slits (not labeled), which respectively replace the first, second, third, and fourth protrusions 241, 242, 243, 244 of the multi-domain vertical alignment LCD 200. The fifth slits are arranged similar to the first, second, third, and fourth protrusions 241, 242, 243, 244 of the multi-domain vertical alignment LCD 200.

Further or alternative embodiments may include the following. In a first example, the first, second, third, and fourth slits 281, 282, 283, 284 can be replaced by a number of protrusions arranged similar to the first, second, third and fourth slits 281, 282, 283, 284. In a second example, the width L1 of each first slit 281 can be different from the width L2 of each third slit 283, in order to further differentiate a first ratio W1/L1 and a second ratio W2/L2. In a third example, the first protrusions 241 can be arranged approximately parallel to, or inclined to, the third protrusions 243. In a fourth example, the two first main strips 241a of the two protrusions 241 in each first pixel region 250 connect with each other. In a fifth example, the second extending strips 243c of the third protrusions 243 in each second pixel region 260 connect with each other.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A multi-domain vertical alignment LCD comprising:
   a first substrate comprising a first transparent substrate, a common electrode formed at an inner surface of the first transparent substrate, and a plurality of first, second, third, and fourth protrusions arranged at an inner surface of the common electrode;
   a second substrate comprising a second transparent substrate, a plurality of pixel electrodes formed at an inner surface of the second transparent substrate, and a plurality of first, second, third, and fourth slits defined in the pixel electrodes; and a liquid crystal layer sandwiched between said first and second substrates, wherein a plurality of pixel regions are defined by said first and second substrates and the liquid crystal layer sandwiched therebetween, the pixel regions are arranged in a regular array, and each pixel region comprises:

a first sub-pixel region corresponding to two of the first protrusions, one of the second protrusions, one of the first slits, and two of the second slits, and being divided into four domains by the first and second protrusions and the first and second slits, and a second sub-pixel region corresponding to two of the third protrusions, one of the fourth protrusions, one of the third slits, and two of the fourth slits, and being divided into four domains by the third and fourth protrusions and the third and fourth slits, wherein a first ratio of a first distance between the first slit and each of the two second slits to a first width of the first slit is less than a second ratio of a second distance between the third slit and each of the two fourth slits to a second width of the third slit.

2. The multi-domain vertical alignment LCD as claimed in claim 1, wherein in the first sub-pixel region, the two first protrusions comprise two first main strips each arranged along a respective one of two arms of a V-shaped path, the second protrusion is arranged along a substantially T-shaped path, the first slit is arranged along a Y-shaped path and is located between the two first main strips and the second protrusion, and each of the two second slits is arranged along a strip path and is respectively parallel to the first main strips of the first protrusions; and in the second sub-pixel region, the two third protrusions, the fourth protrusion, the third slit, and the two fourth slits correspond to the two first protrusions, the second protrusion, the first slit, and the two second slits, respectively.

3. The multi-domain vertical alignment LCD as claimed in claim 2, wherein the first slit comprises a V-shaped slit adjacent to the second protrusion, and a strip slit connecting to a point portion of the V-shaped slit.

4. The multi-domain vertical alignment LCD as claimed in claim 2, wherein the two third protrusions comprise two second main strips each arranged along a respective one of two arms of another V-shaped path, the fourth protrusion is arranged along a substantially T-shaped path, the third slit is arranged along a Y-shaped path and is located between the second main strips of the third protrusions and the fourth protrusion, and each of the two fourth slits is arranged along a strip path and respectively parallel to the second main strips of the third protrusions.

5. The multi-domain vertical alignment LCD as claimed in claim 4, wherein the third slit comprises a V-shaped slit adjacent to the fourth protrusion, and a strip slit connecting to a point portion of the V-shaped slit.

6. The multi-domain vertical alignment LCD as claimed in claim 4, wherein the V-shaped path formed by the second main strips is parallel to the V-shaped path formed by the first main strips.

7. The multi-domain vertical alignment LCD as claimed in claim 4, wherein the first protrusions, the second protrusions, the first slits, and the second slits corresponding to each first sub-pixel region are symmetrical about a first axis, and the third protrusions, the fourth protrusions, the third slits, and the fourth slits corresponding to each second sub-pixel region are symmetrical about a second axis.

8. The multi-domain vertical alignment LCD as claimed in claim 7, wherein the second transparent substrate further comprises a plurality of data lines and a plurality of gate lines, the data lines being parallel to each other, each of the data lines extending along a first direction, the gate lines being parallel to each other, each of the gate lines extending along a second direction that is orthogonal to the first direction, a smallest area formed by any two adjacent gate lines together with any two adjacent data lines defining one of the pixel regions, the first and second axes being parallel to the gate lines.

9. The multi-domain vertical alignment LCD as claimed in claim 4, wherein the two first protrusions in each first sub-pixel region further comprise two first extending strips, respectively extending from two ends of the first main strips to two right corners of the first sub-pixel region, and being parallel to the gate lines, and the third protrusions in each second sub-pixel region further comprise two second extending strips, respectively extending toward each other, and being inwardly adjacent and parallel to the corresponding data lines.

10. The multi-domain vertical alignment LCD as claimed in claim 9, wherein the two first extending strips of the two first protrusions in each first sub-pixel region are connected with each other, and the two second extending strips of the two third protrusions in each second sub-pixel region are connected with each other.

11. The multi-domain vertical alignment LCD as claimed in claim 4, wherein the second protrusion comprises two inclined sides at two inner elbow portions of the T-shaped path, the inclined sides being parallel to the first main strips, respectively.

12. The multi-domain vertical alignment LCD as claimed in claim 4, wherein the first distance between the first slit and each of the two second slits is less than the second distance between the third slit and each of the two fourth slits, and the first width of the first slit is approximately equal to the second width of the third slit.

13. The multi-domain vertical alignment LCD as claimed in claim 4, wherein the two first main strips of the first protrusions are respectively located between the first slit and the second slits.

14. A multi-domain vertical alignment LCD comprising:

a first substrate comprising a first transparent substrate, a common electrode formed at an inner surface of the first transparent substrate, and a plurality of first, second, third, and fourth slits arranged at an inner surface of the common electrode;

a second substrate comprising a second transparent substrate; a plurality of pixel electrodes formed at an inner surface of the second transparent substrate, and a plurality of fifth, sixth, seventh, and eighth slits defined in the pixel electrodes; and a liquid crystal layer sandwiched between said first and second substrates, wherein a plurality of pixel regions are defined by said first and second substrates and the liquid crystal layer sandwiched therebetween, the pixel regions are arranged in a regular array, and each pixel region comprises:

a first sub-pixel region corresponding to two of the first slits, one of the second slits, one of the fifth slits, and two of the sixth slits, and being divided into four domains by the first and second slits and the fifth and sixth slits, and a second sub-pixel region corresponding to two of the third slits, one of the fourth slits, one of the seventh slits, and two of the eighth slits, and being divided into four domains by the third and fourth slits and the seventh and eight slits, wherein a first ratio of a first distance between the fifth slit and each of the two sixth slits to a first width of the fifth slit is less than a second ratio of a second distance between the seventh slit and each of the two eighth slits to a second width of the seventh slit.

15. The multi-domain vertical alignment LCD as claimed in claim 14, wherein in the first sub-pixel region, the two first slits comprise two first main strips each arranged along a respective one of two arms of a V-shaped path, the second slit is arranged along a substantially T-shaped path, the fifth slit is arranged along a Y-shaped path and is located between the first main strips and the second slit, each of the two sixth slits is arranged along a strip path and is respectively parallel to the first main strips of the first slits; and in the second sub-pixel region, the third slits, the fourth slit, the seventh slit, and the eighth slits correspond to the first slits, the second slit, the fifth slit, and the sixth slits, respectively.

16. The multi-domain vertical alignment LCD as claimed in claim 15, wherein the two third slits comprise two second main strips each arranged along a respective one of two arms of another V-shaped path, the fourth slit is arranged along a T-shaped path, the seventh slit is arranged along a Y-shaped path and is located between the second main strips of the third slits and the fourth slit, and each of the two eighth slits is arranged along a strip path and respectively parallel to the second main strips of the third slits.

17. The multi-domain vertical alignment LCD as claimed in claim 16, wherein the first slits, the second slits, the fifth slits, and the sixth slits corresponding to each first sub-pixel region are symmetrical about a first axis, and the third slits, the fourth slits, the seventh slits, and the eight slits corresponding to each second sub-pixel region are symmetrical about a second axis.

18. The multi-domain vertical alignment LCD as claimed in claim 16, wherein the second substrate further comprises a plurality of data lines and a plurality of gate lines, the data lines being parallel to each other, each of the data lines extending along a first direction, the gate lines being parallel to each other, each of the gate lines extending along a second direction that is orthogonal to the first direction, a smallest area formed by any two adjacent gate lines together with any two adjacent data lines defining one of the pixel regions, the first and second axes being parallel to the gate lines.

19. The multi-domain vertical alignment LCD as claimed in claim 16, wherein the first slits in each first sub-pixel region further comprise two first extending strips connecting to the first main strips, respectively, the two first extending strips extending from two ends of the first main strips to two right corners of the first sub-pixel region, and being parallel to the gate lines, and the third slits in each second sub-pixel region further comprise two second extending strips extending toward each other, and being inwardly adjacent and parallel to the corresponding data lines.

20. The multi-domain vertical alignment LCD as claimed in claim 16, wherein the first distance between the fifth slit and each of the two sixth slits is less than the second distance between the seventh slit and each of the two eight slits, and the first width of the fifth slit is approximately equal to the second width of the seventh slit.

* * * * *